US007803202B2

(12) United States Patent
Mahlendorf et al.

(10) Patent No.: US 7,803,202 B2
(45) Date of Patent: Sep. 28, 2010

(54) REFORMER UNIT FOR GENERATING HYDROGEN FROM A STARTING MATERIAL COMPRISING A HYDROCARBON-WATER MIXTURE

(76) Inventors: Falko Mahlendorf, Zur Steinheide 42, 47804 Krefeld (DE); Jurgen Roes, Rheinstr. 8, 46499 Hamminkeln (DE); Jens Mathiak, Am Graben 38, 44579 Castrop-Rauxel (DE)

( * ) Notice: Subject to any disclaimer, the term of this patent is extended or adjusted under 35 U.S.C. 154(b) by 1273 days.

(21) Appl. No.: 10/488,439

(22) PCT Filed: Aug. 22, 2002

(86) PCT No.: PCT/DE02/03064

§ 371 (c)(1),
(2), (4) Date: Feb. 7, 2005

(87) PCT Pub. No.: WO03/024867

PCT Pub. Date: Mar. 27, 2003

(65) Prior Publication Data

US 2006/0188434 A1 Aug. 24, 2006

(30) Foreign Application Priority Data

Sep. 3, 2001 (DE) ................. 101 42 999

(51) Int. Cl.
*C01B 3/38* (2006.01)
(52) U.S. Cl. ......................... 48/61; 48/127.9
(58) Field of Classification Search ......... 48/62 R–62 A
See application file for complete search history.

(56) References Cited

U.S. PATENT DOCUMENTS

| 5,232,682 A | 8/1993 | DuPont |
| 6,162,267 A | 12/2000 | Priegnitz et al. |
| 6,413,479 B1 * | 7/2002 | Kudo et al. ................. 422/198 |
| 6,645,443 B1 | 11/2003 | Vogel et al. |
| 2001/0029735 A1 * | 10/2001 | Miura et al. .................. 60/512 |

FOREIGN PATENT DOCUMENTS

| DE | 691 00 460 T2 | 10/1993 |
| DE | 693 14 245 T2 | 10/1997 |
| DE | 100 57 537 A1 | 6/2002 |
| DE | 197 21 630 C1 | 6/2003 |
| EP | 0 578 218 B1 | 10/1997 |
| EP | 0 861 802 A2 | 9/1998 |
| EP | 0 922 666 A1 | 6/1999 |
| EP | 1 094 031 A1 | 4/2001 |

OTHER PUBLICATIONS

International Search Report for PCT Application No. PCT/DE02/03064.
International Preliminary Examination Report for PCT Application No. PCT/DE02/03064.

* cited by examiner

*Primary Examiner*—Alexa D Neckel
*Assistant Examiner*—Imran Akram
(74) *Attorney, Agent, or Firm*—Foley & Lardner LLP

(57) ABSTRACT

The invention relates to a compact steam reformer which generates a hydrogen-rich product gas from hydrocarbons or hydrocarbon derivatives with heat recapture from the reformate, and to a process for producing the hydrogen-containing product gas. The product gas may, for example, be used in a cell to generate current and heat.

8 Claims, 3 Drawing Sheets

Figure 1:
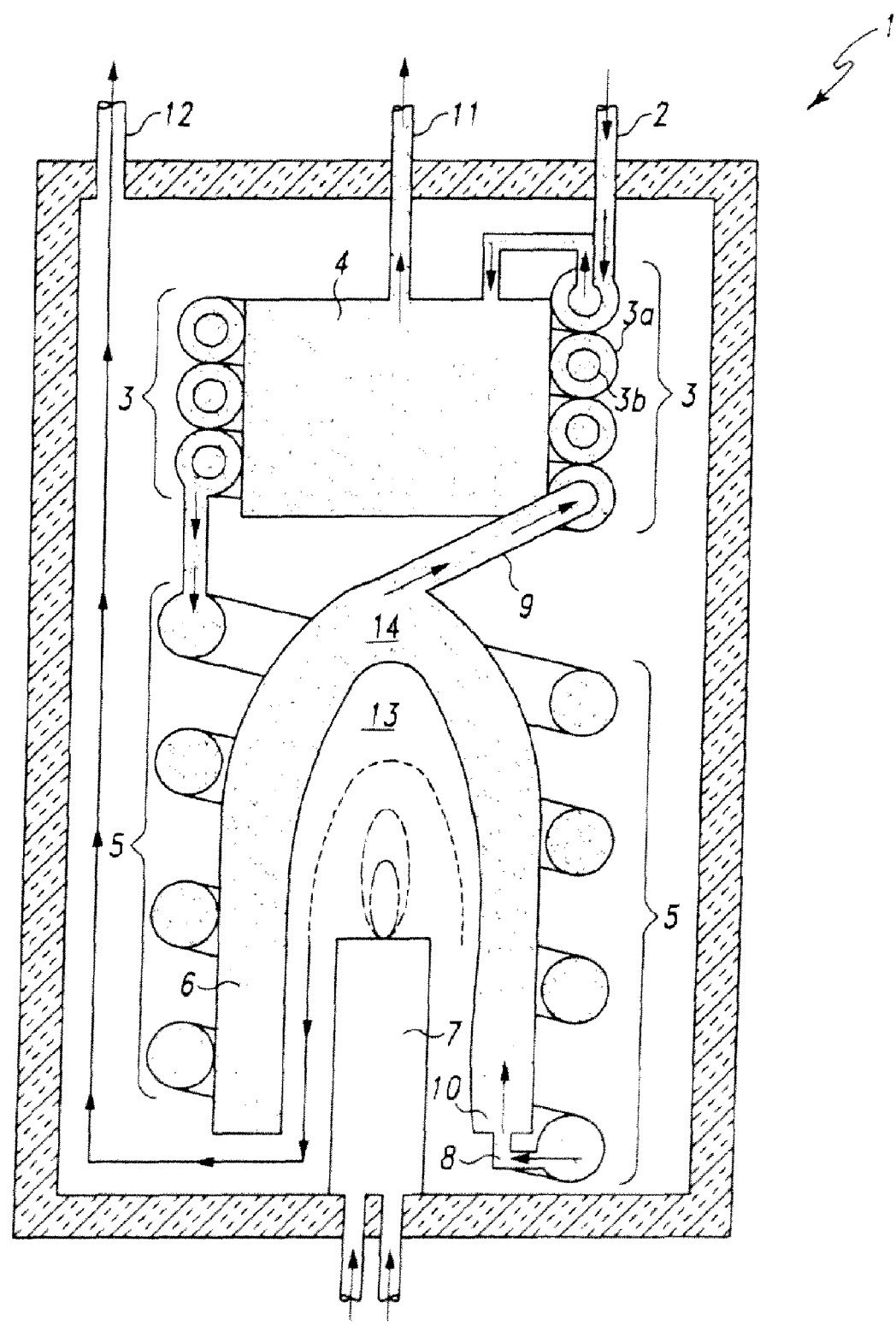

REFORMER UNIT FOR GENERATING HYDROGEN FROM A STARTING MATERIAL COMPRISING A HYDROCARBON-WATER MIXTURE

The invention relates to a compact steam reformer which generates a hydrogen-rich product gas from hydrocarbons or hydrocarbon derivatives with water being supplied, and to a process for producing the hydrogen-containing product gas. The product gas may, for example, be used in a fuel cell where current and heat are generated.

The apparatus of the invention is preferably suitable for the production of a hydrogen-containing product gas for supplying fuel cells in the steady-state, decentralized power range. The installation sizes range from current generation in the MW range through block-type thermal power stations generating a few hundred kW for combined heat and power generation, to an electric power of 1-10 kW for individually supplying individual houses and apartment blocks. In particular, it is possible to produce domestic energy supply installations based on the fuel natural gas for supplying power and heat to households. In terms of size, it is in principle possible for the entire system to be integrated in a wall-mounted boiler. To form efficient hydrogen-generating reactors for the abovementioned applications, the heat sources, heat sinks and temperature levels inside the reactor have to be optimally matched to one another in order to reduce heat losses to the environment to a minimum.

To ensure that the required heat is introduced into the reaction space, in the inventive configuration of the steam reformer either a radiation burner or a burner with one or more punctiform heat sources is used. The flue gas and the product gas are in this case passed in countercurrent with respect to the starting-material flow. Furthermore, the internal heat fluxes in the steam reformer are in accordance with the invention connected in such a way that there is no need for cooling lines or further heating means for controlling the temperature levels.

It is known that a hydrogen-containing product gas can be produced by steam reforming of hydrocarbons, in particular of methane as the main constituent of natural gas.

Steam reforming substantially involves the following two independent reaction equations $$CH_4 + H_2O \rightarrow CO + 3H_2 \quad \Delta_R H^0 = 206 \text{ kJ/mol}, \quad (1)$$

$$CH_4 + 2H_2O \rightarrow CO_2 + 4H_2 \quad \Delta_R H^0 = 165 \text{ kJ/mol} \quad (2)$$

with heat being supplied at a catalyst (e.g. Ni or Pt) at reaction temperatures of 600-950° C. Heat is supplied via a burner, which is operated with the abovementioned fuel gases. Since CO concentrations of up to over 10% by volume are established, depending on the reaction parameters pressure, temperature and steam excess downstream of the reformer stage, two further reaction stages are often connected downstream in order to lower the level of carbon monoxide and to obtain further hydrogen, there reaction stages being known as the shift converters. Conversion takes place in accordance with the exothermic homogeneous water-gas reaction $$CO + H_2O \rightarrow CO_2 + H_2 \quad \Delta_R H^0 = -41 \text{ kJ/mol} \quad (3)$$

in two temperature stages, the high-temperature shift (HT shift) at an Fe/Cr catalyst at temperatures between 330 and 500° C., and the low-temperature shift (LT shift) at a Cu/Zn catalyst at 190 to 280° C. Afterwards, the hydrogen-rich gas mixture still has a carbon monoxide content of approximately 0.5-1%.

The industrial steam reforming of natural gas results in a product gas of which approximately 75% is hydrogen.

In the case of natural gas/water reforming, the introduction of the reaction heat constitutes the limiting factor and is therefore the focus of development of technical apparatus and installations. On a large industrial scale, it is customary to use tubular reactors which are externally heated by a hot flue gas for modularity purposes. A reactor of this nature for the steam reforming of natural gas is known from the U.S. Pat. No. 5,229,102. In this case, the starting-material gas is passed through a double-walled tube system which is filled with catalyst and in which the reforming reactions take place. The hydrogen is selectively extracted from the reforming space into a hydrogen extraction space through the inner tube, which is configured so as to be porous. The reforming reaction space is heated by the hot flue gas from a plurality of outer burners. There is no provision for the internal heat fluxes to be interconnected or for shift stages to be integrated in the reformer.

In the case of a steam reformer which is described in EP 0 195 688, the heat required for the reforming is provided by a central burner, which is surrounded by a ceramic tube. The hot flue gas flows in an annular space between the burner tube and a second reforming space which is arranged concentrically with respect thereto, with flue gas and starting material (fuel gas/steam mixture) being passed in cocurrent. As the flow continues, the flue gas, in countercurrent, transfers additional heat to the starting-material mixture, which flows through a first reforming space which is arranged concentrically with respect to the second reforming space and is connected to the latter in terms of flow.

Further reformer reactors are described in U.S. Pat. No. 5,164,163. In the case of the reformer device of cylindrical structure which is presented in that document, a burner for generating hot flue gas is arranged centrally in the interior of the device. The starting-material mixture comprising flue gas and steam is passed through two double-layered tubes which surround the burner and are connected to one another on one side.

A device which is described in DE 197 21 630 C1 uses a radiation burner to areally heat the reformer reactor, which is composed of two parts, from the outside. The reformer reactor comprises an inner tube reactor and an annular gap reactor which surrounds the tube reactor at a distance. In the gap between tube reactor and annular gap reactor, the hot flue gas is passed in countercurrent to the natural gas in the tube reactor. The starting materials are fed to the tube reactor through a heat exchanger which is designed as a tube coil, where they are heated by the flue gas passed in countercurrent. There is no provision for the sensible heat of the hydrogen-containing product gas to be utilized and for shift stages to be integrated in the reformer.

Installations for generating hydrogen which are known from the prior art cannot be reduced in size by simple scale-down, since this gives rise to disproportionately high heat losses. Furthermore, for applications in the domestic energy supply sector there are high demands on the dynamics and overall volume.

Therefore, the object of the invention consists in providing an improved process and an installation for producing hydrogen-containing product gas in the low power range.

The object of the invention is achieved by the provision of a compact and efficient steam reforming reactor for use in decentralized fuel cell systems in the low power range, and a process, preferably using the steam reforming reactor according to the invention.

Therefore, the present invention relates to a reformer unit for generating hydrogen from a starting material comprising a hydrocarbon-water mixture, having:

a reactor vessel;

a feed line for feeding a starting material into the reactor vessel;

a heat exchanger, which is connected to the starting-material feed line and has a first tube, which is connected to the feed line, and a second tube;

a further heat exchanger, which is connected to the first tube of the heat exchanger and is arranged around a reformer space;

a line which is connected to the heat exchanger and has at least one outlet opening for feeding the gaseous starting material into the reformer space, with a catalyst unit arranged therein which can be heated by a burner;

at least one discharge line for discharging the reformate which has been formed in the reformer space to the second tube of the heat exchanger, which at the other end is connected to a shift reactor; and a product discharge line for the product gas which has been discharged from the shift reactor, and at least one discharge line for the flue gas from the reactor vessel.

The steam reforming reactor according to the invention has a compact overall volume, with all the reactors and heat exchangers accommodated in a sheathing. The efficiency of hydrogen generation (lower calorific value of the hydrogen produced with respect to the lower calorific value of the fuel for reforming and supplying the burners) of the reformer in the nominal load range is approx. 80% and is therefore of a similar order of magnitude to large-scale industrial installations for hydrogen production.

The present invention also relates to a process for generating hydrogen from gaseous hydrocarbons, in which a starting material comprising a hydrocarbon gas/water mixture is fed into a reactor vessel via a feed line leading into a first countercurrent heat exchanger, which is situated in the reactor vessel, the starting-material gas mixture which emerges from the first heat exchanger is fed to a second heat exchanger for further heating, the starting-material gas which has been heated further and is discharged from the second heat exchanger is fed to a reformer space with a catalyst unit arranged therein and a burner, which is operated with fuel gas and oxygen/air, the reformate discharged from the reformer space, via a discharge line is fed to the first heat exchanger and is fed, in countercurrent to the starting material supplied, to a low-temperature shift reactor, and the product gas discharged from the low-temperature shift reactor is discharged from the reactor vessel.

In a preferred embodiment, the product gas discharge is passed via a fine-purification stage, with the result that the carbon monoxide content of the product gas is lowered further.

A particular feature of the process according to the invention is that in a preferred embodiment the starting material is passed in countercurrent both to the reformate discharged from the reformer space and in countercurrent to the flue gas discharged from the combustion chamber.

Therefore, the process according to the invention preferably uses a coaxial heat exchanger which has a first, outer tube and a second, inner tube, which is surrounded by the outer tube. The starting material/water mixture is passed towards the reformer space in the outer tube, while in the inner tube the reformate is passed from the reformer space to the shift reactor. At the same time, the outer wall of the outer tube is acted on by the hot flue gas, so that intensive heat transfer to the starting material/water mixture which is to be heated takes place on both sides.

The shift reactor may be designed as a low-temperature shift reactor, which is usually operated in the temperature range between 180° and 250° C., or, depending on the particular conditions, as a high-temperature shift reactor, which is usually operated in the temperature range between 350° and 500° C. With a view to achieving a compact structure of the overall reformer, with the temperature management in the reactor vessel which this allows, the embodiment in the form of a low-temperature shift reactor is preferred.

Liquid water and fuel gas are fed to the steam reformer as starting materials, and the burner is supplied with air and fuel gas. The products discharged are flue gas and product gas. The hot flue gas serves primarily to provide the endothermic reaction heat for the reforming reactions. Furthermore, as the flow continues, both the sensible heat of the hot flue gas and that of the reformate are used to preheat the starting materials (fuel gas and liquid water).

The internal heat fluxes are coupled in such a way that there is no need for any cooling lines or further heating means to control the temperature level. Control is effected by metering of the starting-material streams: the reformer temperature is controlled within the limits by means of the steam-to-carbon (S/C) ratio via the combustion power and the shift temperature. In this case, the S/C ratio is preferably 2-4, particularly preferably 3.

In the preferred embodiment of the reformer unit according to the invention, it is preferable for an upper region and a lower region to be provided in the reaction vessel, in which case the lines for supplying the starting material and for discharging the product gas and the flue gas are provided in the upper region. The feed line is preferably directly connected to the first heat exchanger, which is preferably arranged helically around the shift reactor for heat exchange purposes.

The heated product gas is fed from the bottom end of the first heat exchanger to a second heat exchanger, in which heat exchange takes place only between the flue gas discharged from the burner chamber and the product gas which has already been heated and is located inside the second heat exchanger.

The starting-material gas which has been heated further is passed from the second heat exchanger, in the vicinity of the bottom of the reaction vessel, into the space surrounding the burner, where the starting-material gas is released from the feed line into the space surrounding the burner and is subjected to the reforming step in the catalyst unit.

Above the catalyst unit there is preferably a cavity, from which a discharge line for the reformate, preferably arranged in the centre, is connected to the inner tube of the first tubular exchanger which reformate is passed in countercurrent to the starting material supplied.

The compact configuration of the steam reformer in accordance with the invention as a unit comprising reformer, reformer burner, shift reactor and optional CO gas fine purification can be realized in the power range from 500 Watts to 50 kW. In conjunction with a fuel cell, it is possible to form domestic power supply installations for supplying electricity and heat to households. In terms of its dimensions, the entire system can be integrated in a wall-mounted boiler.

To introduce the required heat into the reaction space, the configuration of the steam reformer according to the invention uses either a radiation burner or a burner with one or more punctiform heat sources. According to the invention, a concentric arrangement is recommended for this purpose, in which case the heat is introduced by radiation and convection. Flue gas and starting-material mixture (fuel gas and water) are in this case passed in countercurrent.

The reaction temperature which is reached is crucial in determining the conversion of the reformer fuel used, firstly through the position of the thermodynamic equilibrium and secondly through the increase in the reaction rate, and consequently has a huge effect on the efficiency. The reformer temperature can be controlled by means of the burner power. The combination of heat transfer through radiation and convective heat transfer of the flue gas in countercurrent to the starting-material stream (fuel gas/steam mixture) makes it possible to establish a sufficiently high reaction temperature in the upper region of the reformer catalyst with the minimum possible burner power. The efficiency of a steam reformer is highly dependent on the ratio of the fuel gas flow required for the reforming to the gas flow required for the burner. The higher this ratio, the higher the efficiency of the reformer system.

In the first heat exchanger in the reforming device according to the invention, the preheating of the starting material (fuel and water), in the embodiment as a coaxial heat exchanger in the annular gap, takes place simultaneously as a result of the cooling of the reformate from the inside (from approximately 700° C. to 200° C.) and as a result of the drop in the flue gas temperature on the outside. Therefore, in the construction according to the invention there is preferably a coaxial heat exchanger coil. The hot reformate is routed in the inner tube, the cold starting-material mixture is routed in the intermediate space and the hot flue gas is routed around the coil, with both countercurrent and cocurrent embodiments being possible. The heat exchanger coil may preferably be arranged in a space-saving manner around a low-temperature shift reactor. This simultaneously allows cooling of this reactor.

The present invention, therefore, as an important element of the invention, also relates to a countercurrent heat exchanger having 1. a heat exchanger comprising an inner tube for receiving a heat-releasing fluid and an annular-gap tube surrounding the inner tube for receiving the fluid which is to be heated, also referred to as a spiral double tube or coaxial heat exchanger, and 2. an outer tube surrounding the heat exchanger, the starting material in the annular-gap tube being passed in countercurrent to the product gas routed in the inner tube and in countercurrent to the flue gas flowing around the outside of the annular-gap tube and from this heat exchanger being fed, if appropriate via a further heat exchanger, to the reformer region for catalytic conversion. In a preferred embodiment, the outer tube which surrounds the coaxial heat exchanger is designed in the form of the reactor vessel.

In this case, the coaxial heat exchanger, preferably with turns which are coaxially spaced apart, is preferably arranged in such a way in the reactor vessel that the hot flue gas discharged from the burner space flows around the coaxial heat exchanger at least in the spiral double tube intermediate space. In a preferred embodiment, the spiral double tube is arranged around a shift reactor, which is preferably designed as a low-temperature shift reactor.

In another embodiment of the countercurrent heat exchanger of the present invention, this heat exchanger is designed in the form of a countercurrent heat exchanger with a hollow cylinder block having two hollow cylinders which have the same axial length but different diameters and are fitted into one another, and having a spiral tube for receiving a heat-absorbing fluid, the spiral tube being arranged in the cylindrical annular gap between the two hollow cylinders and bearing tightly against the outer and inner wall of these hollow cylinders.

In this case, the cylindrical annular gap between the hollow cylinders is closed off at both ends by an annular closure plate, and in each case at least one feed or discharge for the fluids passed in countercurrent leading into the spiral tube or the cylindrical annular gap are present in the closure plates.

An outer tube with a feed and discharge for receiving a further heat-releasing fluid is provided surrounding the hollow cylinder block, at a distance from it, with feeds and discharges for the heat-releasing fluids and the heat-absorbing fluid leading into the respective compartments being in each case provided and with the fluid which is to be heated, in the annular gap tube, being passed in countercurrent with respect to the two heat-releasing fluids.

The outer side of the hollow cylinder block is acted on by the hot flue gas, which leads to further heat exchange with the interior of the double cylinder.

In hydrogen-generating installations, it is customary for two shift reactors to be used at different temperature levels for reacting the carbon monoxide with water to form carbon dioxide and hydrogen. Reasons which are frequently cited for this are a higher reaction rate at a higher temperature (~400° C.) and an equilibrium which is further on the $CO_2$ side at a lower temperature (~200° C.). Moreover, during the exothermic reaction the use of a high-temperature shift reactor (HT shift reactor) means that the heat is released at a higher temperature level and can therefore be utilized more successfully on a large industrial scale.

In the compact steam reformer of the invention, it is preferably possible to dispense with the use of an HT shift reactor in order to reduce the overall volume and to simplify thermal integration. The heat, which is otherwise distributed between two reactors, is therefore released in a single reactor and can be utilized more successfully. Moreover, omitting the high-temperature shift simplifies control of the installation, since there is less need to monitor and to control a temperature value. Furthermore, when commissioning iron/chromium-containing HT shift catalysts, on account of the removal of the initial sulphur loading, it is necessary to provide a bypass line around the LT shift reactor so that the LT shift catalyst is not poisoned. This additional line and corresponding control can be dispensed with in the preferred configuration of the steam reformer which has been described.

Figure 2:
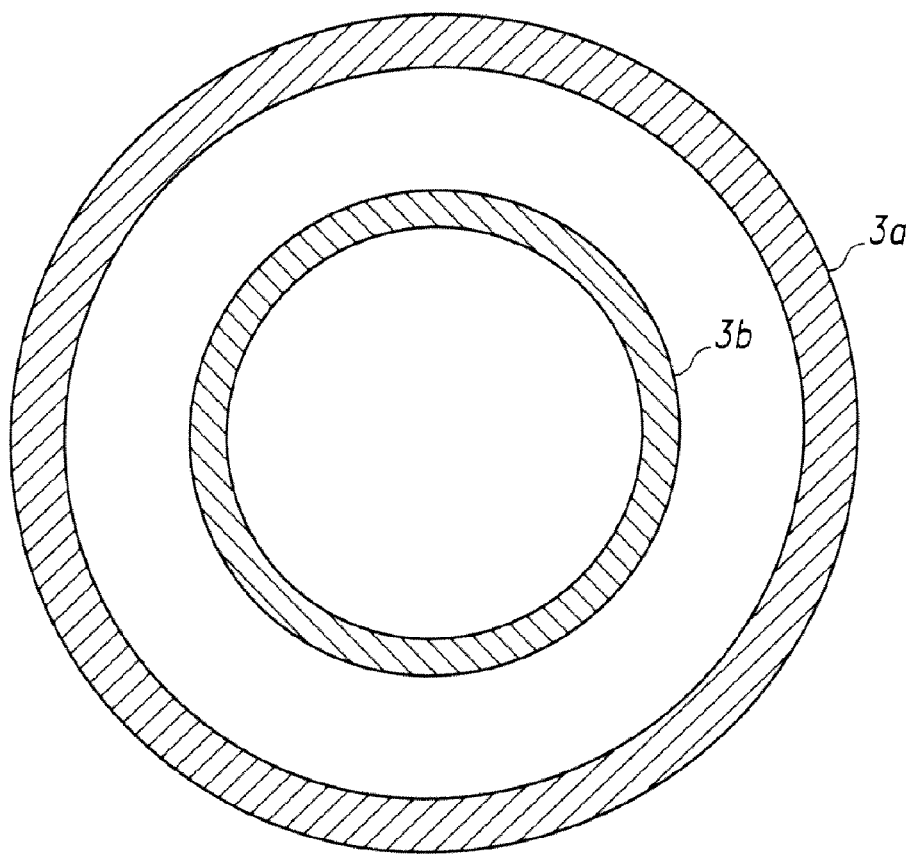
Figure 3:
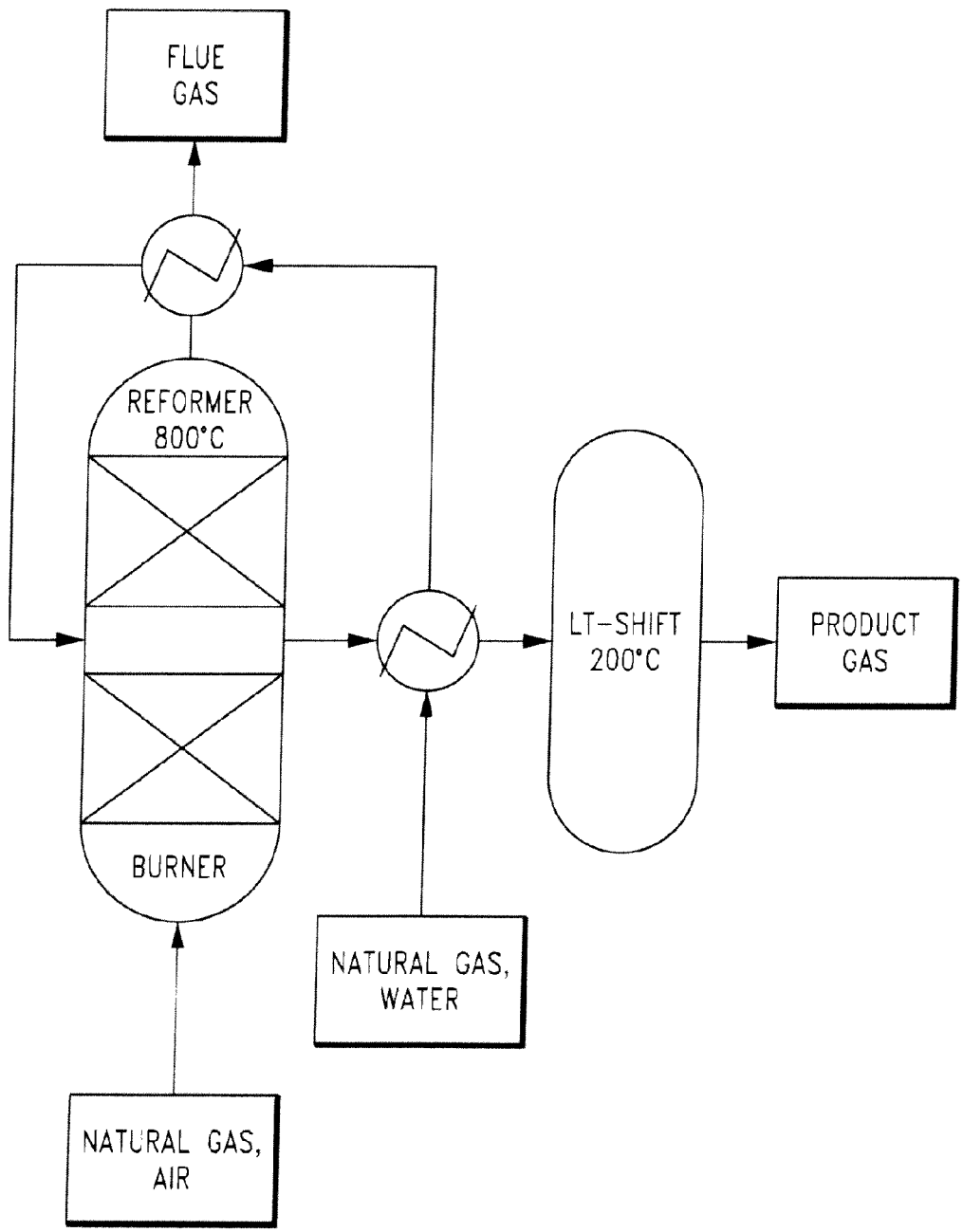

The invention is to be explained in more detail below with reference to drawings, in which:

FIG. 1 diagrammatically depicts the reformer unit, in cross section, for generating hydrogen by means of steam reforming of hydrocarbons;

FIG. 2 diagrammatically depicts the heating of the starting-material mixture by the hot flue gas and product gas (reformate) in accordance with the invention;

FIG. 3 shows the process technology linking of the reformer unit.

In the embodiment shown in FIG. 1, the cylindrical reformer unit 1 has a starting-material inlet line 2. The hydrocarbon which is to be reformed and liquid water are passed into the annular gap formed by outer tube 3a and inner tube 3b of the coaxial heat exchanger 3 in a preset S/C ratio via this line 2. The coaxial heat exchanger coil 3 is arranged concentrically around the low-temperature shift reactor 4.

In the inner tube 3b of the coaxial heat exchanger coil, the hot reformate which comes out of the reformer region is passed in countercurrent with respect to the starting-material mixture, while the hot flue gas flows around the outside of the coaxial heat exchanger coil. Therefore, the preheating and evaporation of the starting materials take place in the annular gap in the abovementioned coaxial heat exchanger as a result of the simultaneous cooling of the reformate from the inside and the reduction in the flue gas temperature on the outside. In the embodiment shown, the starting-material mixture is passed in countercurrent both with respect to the reformate and with respect to the flue gas.

After it has flowed through the coaxial heat exchanger coil 3, the starting material is passed into a further tube coil 5, which is arranged concentrically around the reforming space 6 and burner 7. The starting-material mixture is heated further by the hot flue gas flowing past the outside of the tube coil in countercurrent and is passed into the reforming space 6 via the gas distributor tube 8.

After they have flowed through the reforming space 6, the reformed starting materials pass into the upper region of the reformer and are extracted via the pipeline 9 and fed to the inner tube 3*b* of the coaxial heat exchanger coil 3.

The reforming space 6 is in this case preferably designed as a concentric annular gap around the burner 7, which is delimited at the top by a dome, for example in the form of a dished boiler head, or is delimited by the shape of a planar circular disk. The cross section of the upper reformer region is circular in form. In the inlet region of the reformer, a free volume 10 is provided for distributing the gases uniformly over the cross section of flow. In design terms, this can be implemented by means of a screen base which supports the catalyst material.

The reforming region can be subdivided into a pre-reforming region and a main reforming region, in which different catalysts, which are active at the prevailing temperatures, may be used. Moreover, the different catalysts may be separated by catalytically inactive beds or by further screen bases. On account of this temperature distribution, the pre-reformer is used in the inlet region and the main reformer is used in the outlet region. Both catalysts may, for example, contain Pt or Ni and may consist of a bed of bulk material or a coated honeycomb.

The pipeline 9 may be arranged centrally in the middle of the upper reformer region or may alternatively be arranged radially.

Natural gas, for example a hydrogen-containing anode exhaust gas from a fuel cell, and air are fed to the burner 7 via fuel-gas feed (not shown) and air feed. The flue gas which is formed during the combustion is used to heat the reforming space.

The cylindrical reformer unit 1 and the reformer region 6 are preferably provided with an insulation layer for thermal insulation.

As shown in FIG. 2, the coaxial heat exchanger spiral 3 comprises an inner tube 3*b*, in which the reformate which leaves the reformer 6 is cooled, and an outer tube 3*a*, which carries the cold starting material (hydrocarbon/water mixture). Flue gas flows around the outer tube 3*a*, leading to additional preheating of the starting material. This double heat exchange, from starting-material mixture to the hydrogen-containing reformate and to the flue gas, can in each case take place in cocurrent or preferably in countercurrent. The advantage of the structure illustrated is a small overall size.

Although FIG. 1 illustrates a reformer unit with reformer and a low-temperature shift reactor which follows it as the reformate is passed onwards and is usually operated in the temperature range between 180° and 250° C., according to the invention it is also possible, or may even be necessary depending on the particular conditions, for a further shift reactor, which may be designed as a low-temperature or high-temperature shift reactor, the latter usually being operated in the temperature range between 350° and 500° C., to be provided between the reformer and the low-temperature shift reactor. In this case, reformate is passed from the reforming space into this first shift reactor and is passed to the low-temperature shift reactor in countercurrent to the starting material which has already been preheated, with the routing of starting material, reformate and flue gas preferably corresponding to the routing used for the low-temperature shift reactor as presented above.

LIST OF REFERENCE SYMBOLS

Reformer unit 1
Starting-material inlet line 2
Coaxial heat exchanger 3
with annular-gap tube 3*a* and inner tube 3*b*
Shift reactor 4
Tube coil 5
Reforming space 6
Burner 7
Gas distributor tube 8
Pipeline 9
Free volume 10
Product outlet 11
Flue gas outlet 12
Combustion space 13
Reformer region 14

The invention claimed is:

1. Reformer unit for generating hydrogen from a starting material comprising a hydrocarbon-water mixture, having:
   a. a reactor vessel (1) comprising a combustion chamber;
   b. a feed line (2) for feeding a heat absorbing starting material into the reactor vessel (1);
   c. a heat exchanger (3) in said combustion chamber, said heat exchanger (3) in the form of a coaxial heat exchanger having an outer tube (3*a*) and an inner tube (3*b*), said outer tube (3*a*) connected to the starting-material feed line (2), said starting material in tube (3*a*) in thermal communication with a flue gas in said combustion chamber, said inner tube (3*b*) connecting to a reformer space (6) to receive a reformate, said starting material in tube (3*a*) in thermal communication with reformate in said inner tube (3*b*);
   d. a further heat exchanger (5), which is connected to the outer tube (3*a*) of the heat exchanger (3) and is arranged around the reformer space (6);
   e. a line (8) which is connected to the heat exchanger (5) and has at least one outlet opening for feeding starting material in gaseous form into the reformer space (6), with a catalyst unit arranged therein which can be heated by a burner (7) in said combustion chamber, wherein combustion at the burner results in generation of the flue gas;
   f. at least one discharge line (9) for discharging the reformate which has been formed in the reformer space (6) to the inner tube (3*b*) of the heat exchanger (3), which at the other end is connected to a shift reactor (4); and
   g. a product discharge line (11) for the product gas which has been discharged from the shift reactor (4), and at least one discharge line (12) for the flue gas from the reactor vessel (1).

2. Reformer unit according to claim 1, characterized in that the heat exchanger (3) which is connected to the starting-material feed line (2) is a countercurrent heat exchanger, which has a hollow-cylinder block with two hollow cylinders, which have the same axial length but different diameters and are fitted into one another, and a spiral tube for receiving a heat-absorbing fluid, the spiral tube being arranged in the cylindrical annular gap between the two hollow cylinders, and the spiral tube bearing tightly against the outer or inner wall of these hollow cylinders, the cylindrical annular gap between the hollow cylinders being closed off at both ends by an annular closure plate, and in each case at least one feed or discharge for the fluids passed in countercurrent into the spiral tube or the cylindrical annular gap being present in the closure plates.

3. Reformer unit according to claim 1, characterized in that the heat exchanger (3) which is connected to the starting-material feed line (2) is arranged around the shift reactor (4), which is designed as a low-temperature shift reactor.

4. Reformer unit according to claim 1, characterized in that the line (8) has a plurality of outlet openings or a gap for feeding the gaseous starting material into the reformer space (6).

5. Reformer unit according to claim 1, characterized in that the product discharge line (11) is connected to a unit for purifying the product gas, preferably for reducing the CO content in the product gas.

6. A process for generating hydrogen from gaseous hydrocarbons, comprising providing a starting material comprising a hydrocarbon-water mixture into a reformer unit according to claim 1.

7. The process of claim 6, further comprising:
a. providing the starting material into the outer tube (3a) of the countercurrent heat exchanger (3) arranged in a preheating region in the reactor vessel (1),
b. providing preheated starting material from the outer tube (3a) of the countercurrent heat exchanger (3) to a heat exchanger (5) arranged in the reformer region for further heating,
c. providing the further heated starting material from the heat exchanger (5) to a reformer space (6) with a catalyst unit arranged therein and with a burner (7) which heats the catalyst unit and produces a flue gas,
d. providing the flue gas to the exterior of outer tube (3a) of the countercurrent heat exchanger (3) for preheating of the starting material,
e. providing the reformate discharged from the reformer space (6) via a discharge line (9) to the inner tube (3b) of the countercurrent heat exchanger (3) for preheating of the starting material,
f. providing the reformate from the inner tube (3b) of the countercurrent heat exchanger (3) to a shift reactor (4), and
g. discharging a product gas from shift reactor (4) from the reactor vessel (1).

8. The process of claim 7, wherein the shift reactor (4) is a low-temperature shift reactor.

* * * * *